(No Model.)
E. SHAW.
WATER MOTOR.
No. 245,406. Patented Aug. 9, 1881.
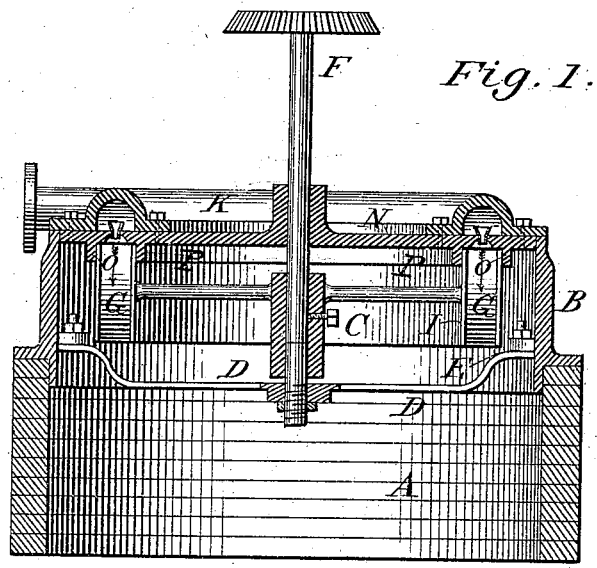
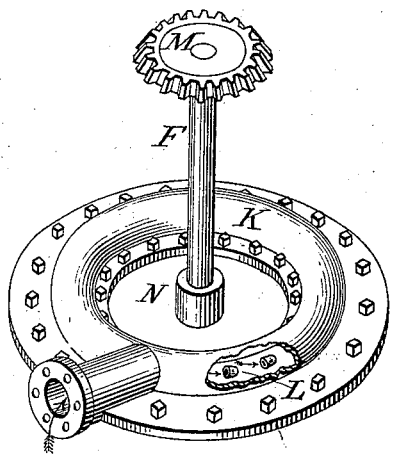
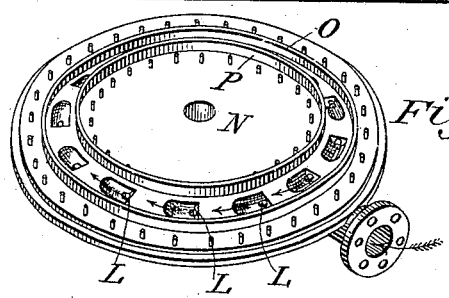
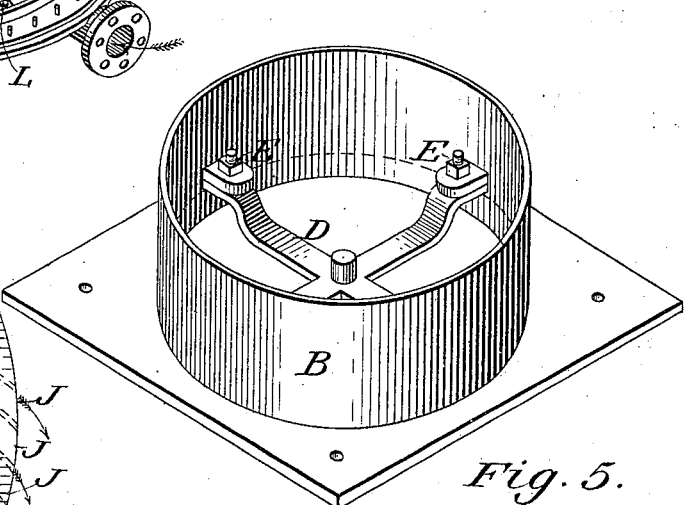
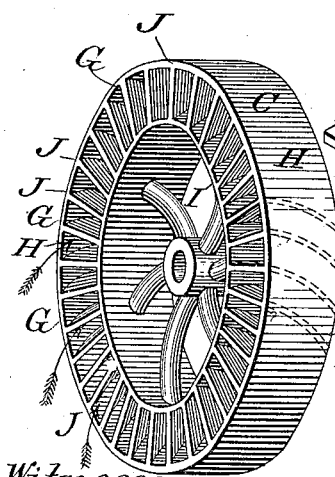
Witnesses:
E. G. Asmus
Francis Stein
Inventor.
Elijah Shaw
By Jas. B. Erwin
Attorney

UNITED STATES PATENT OFFICE.

ELIJAH SHAW, OF MILWAUKEE, WISCONSIN, ASSIGNOR OF ONE-HALF TO WILLIAM GUTENKUNST, OF SAME PLACE.

WATER-MOTOR.

SPECIFICATION forming part of Letters Patent No. 245,406, dated August 9, 1881.

Application filed November 26, 1880. (No model.)

*To all whom it may concern:*

Be it known that I, ELIJAH SHAW, a citizen of the United States, residing at the city of Milwaukee, in the county of Milwaukee and State of Wisconsin, have invented certain new and useful Improvements in Water-Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in water-motors, and pertains more especially to that class which are adapted to be operated by a small quantity of water under high pressure.

Heretofore it has been common to construct the buckets or paddles of the wheel with open sides and to inclose them in a stationary shell, in which case the motion and force of the wheel are greatly reduced by the friction of the water against such shell, and the direct force of the streams is thus lost. It has also been common to allow the water to flow in a large volume and to distribute the stream more or less uniformly between the central shaft and periphery of the wheel, in which case much of the power of the water is lost, as has been demonstrated that a given quantity of water under a given pressure acts with greater force when subdivided into many small streams than when allowed to flow in a single volume; also, that the water has a greater leverage upon the wheel at its periphery than at any intermediate point between it and the center.

The object of my invention is, first, to apply the water to the buckets or paddles of the wheel without allowing it to come in contact with the stationary shell or inclosure, whereby the friction of the water against the shell and its reacting force upon the wheel is obviated, and the water moves forward with the wheel without interruption until its force is spent in driving the wheel, whereby a much greater percentage of the force of the head is utilized than by the ordinary wheels, while the weight of the water in the respective buckets continues to act upon the wheel as it passes downward until it is discharged therefrom; second, to provide a device whereby the water may be distributed in small streams at uniform distances apart upon all the buckets of the wheel simultaneously, and also by which the water is confined in its course from the distributing-reservoir to the buckets of the wheel in such a manner that the force of the head or the weight of the column of water, as well as the jets, is brought to bear upon the wheel.

My invention is further explained by reference to the accompanying drawings, in which—

Figure 1 represents a vertical section. Fig. 2 is a perspective view of the reservoir or distributing-pipe. Fig. 3 represents Fig. 2 as it appears inverted. Fig. 4 is a perspective of the wheel removed from its inclosure. Fig. 5 is a perspective of the casing which incloses the wheel, with wheel removed.

Like parts are represented by the same reference-letters throughout the several views.

A is a substantial wall, which serves the twofold purpose of a support for the motor and a receptacle for the water as it escapes from the wheel.

B is a casing, which surrounds the wheel.

C is the wheel.

D is a bracket for supporting the wheel. The bracket D is rigidly attached to the case B by bolts E.

F is a shaft, to which the wheel is attached, and by which motion is communicated to machinery in the ordinary manner through pinion M or other equivalent means.

G are the buckets of the wheel. They are formed by and comprise the space between the circular rims or shells H I and curved plates J.

K is the reservoir or distributing-pipe. It communicates with the small tubes or orifices L, from which water is projected with great force in many small streams upon all the buckets in the wheel simultaneously. The arrows in Fig. 4 indicate the course of the water as it enters and escapes the buckets.

N is a cover or diaphragm, provided with small tubes or orifices L. It is closely fitted to the case B and confines all the water beneath it. The lower side of the diaphragm is provided with circular flanges O P, which extend downward upon the outside of the buckets or shells, to which they are closely fitted, thus preventing the escape of the water from the buckets and confining it between the revolving shells H I at the periphery of the wheel, where it acts with its greatest power.

The reservoir K is supported upon and rigidly bolted to the diaphragm N directly above the buckets of the wheel, and the tubes L extend downward from the reservoir at an angle through the diaphragm, terminating above the center of the buckets. The angle of the tubes is such that the streams are thrown toward and against the concave surface of the plates J, and the water moves forward or revolves with the wheel as it flows downward, and thus continues to act upon the wheel until it escapes into the receptacle below.

Having thus described my invention, what I claim as new, and desire to secure by Letters Patent, is—

1. In water-motors, the diaphragm N, provided with circular flanges O and P, conforming to the respective circular shells H and I, said circular flanges being adapted to closely fit the shells and prevent the escape of water between their surfaces, whereby the force of the head of the stream is applied to the wheel, substantially as set forth.

2. In water-motors, the combination of the diaphragm N, provided with circular flanges O and P, and a series of distributing tubes or orifices, L, with the circular reservoir K, substantially as set forth.

3. In water-motors, the combination of circular reservoir K, diaphragm N, provided with circular flanges O and P, and a series of tubes, L, and wheel C, provided with circular shells H and I, conforming in shape to and closely fitting the flanges O and P, substantially as set forth.

4. The combination of diaphragm N, provided with flanges O P, and tubes L, circular reservoir K, wheel C, having circular shells H and I, and plates J, case B, and bracket D, all substantially as and for the purpose specified.

In testimony whereof I affix my signature in presence of two witnesses.

ELIJAH SHAW.

Witnesses:
 JAS. B. ERWIN,
 E. G. ASMUS.